United States Patent [19]  [11] 3,951,915
Keck et al.  [45] Apr. 20, 1976

[54] THERMO-OXIDATIVE STABLE COPOLYESTERS

[75] Inventors: Max H. Keck; Richard H. Kline, both of Cuyahoga Falls, Ohio

[73] Assignee: The Goodyear Tire & Rubber Company, Akron, Ohio

[22] Filed: Dec. 20, 1974

[21] Appl. No.: 534,610

[52] U.S. Cl. .................. 260/47 C; 260/45.85 T; 260/45.95 H
[51] Int. Cl.² .................................. C08G 63/18
[58] Field of Search ............ 260/47 C, 45.85, 45.95

[56] References Cited
UNITED STATES PATENTS 3,398,121   8/1968   Oxenrider et al. .................... 260/47
3,669,927   6/1972   Terasaki et al. .................... 260/47 C Primary Examiner—Lester L. Lee
Attorney, Agent, or Firm—F. W. Brunner; J. P. Ward; J. M. Wallace, Jr.

[57] ABSTRACT

High molecular weight, linear copolyester compositions having improved thermo-oxidative stability comprising the condensation product of (A) dicarboxylic acids or the $C_1$ to $C_4$ lower alkyl esters thereof, (B) glycols and (C) copolymerizable hindered phenolic comonomers wherein repeat units of said hindered phenolic comonomers are present in the copolyesters in an amount ranging from about 0.1 to 10.0 mol percent based on the dicarboxylic acids or the $C_1$ to $C_4$ lower alkyl esters thereof.

12 Claims, No Drawings

THERMO-OXIDATIVE STABLE COPOLYESTERS

This invention relates to new and useful high molecular weight copolyesters and to shaped articles therefrom.

Polyesters, such as polyethylene terephthalate, in the form of fibers, yarns and cords, and especially industrial yarns and cords, have attained wide commercial use for a variety of applications. However, in some applications where the polyester containing article is subjected to high temperature environments the polyesters can undergo extreme thermo-oxidative degradation.

High molecular weight linear copolyesters have now been prepared which exhibit a significant improvement in thermo-oxidative stability over that of presently available polyesters such as commercial polyethylene terephthalate. According to the present invention there are provided high molecular weight linear copolyester compositions of improved thermo-oxidative stability comprising the condensation product of (A) an ester forming reactant selected from the group consisting of aromatic dicarboxylic acids or the $C_1$ to $C_4$ lower alkyl esters thereof, mixtures of two or more of said aromatic dicarboxylic acids or two or more of the $C_1$ to $C_4$ lower alkyl esters thereof, mixtures of at least one of said aromatic dicarboxylic acids with at least one saturated aliphatic dicarboxylic acid containing from 4 to 10 carbon atoms and mixtures of at least one of the $C_1$ to $C_4$ lower alkyl esters of said aromatic dicarboxylic acids with at least one $C_1$ to $C_4$ lower alkyl ester of said saturated aliphatic dicarboxylic acids containing from 4 to 10 carbon atoms, (B) glycols selected from the group consisting of glycols of the series $HO(CH_2)_nOH$ where $n$ is an integer from 2 to 10 and 1,4-cyclohexanedimethanol and mixtures thereof, and (C) copolymerizable hindered phenolic comonomers selected from the group consisting of hindered phenolic comonomers corresponding to the formula

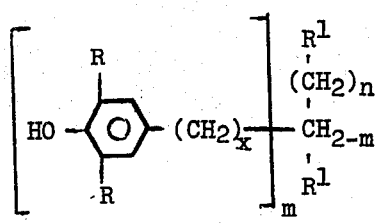

where $x$ and $n$ are integers ranging from 0 to 1, $m$ is an integer ranging from 1 to 2, R is a tertiary alkyl radical containing from 4 to 8 carbon atoms and $R^1$ is a radical selected from the group consisting of —$CH_2OH$, —COOH and —$COOR^2$ where $R^2$ is an alkyl radical containing from 1 to 4 carbon atoms and mixtures thereof and wherein units of said copolymerizable hindered phenolic comonomers are present in the copolyester in an amount ranging from about 0.1 to 10.0 mol percent of (A). By the term "high molecular weight polyester" is meant a copolyester possessing an intrinsic viscosity of at least 0.4 as measured in a 60/40 phenol/tetrachloroethane mixed solvent at 30° C.

The thermo-oxidative stable copolyesters of the present invention can be prepared by any of the well known processes for preparing polymeric polyesters. Thus the copolyesters of this invention can be prepared by either an esterification-polycondensation process or by a transesterification-polycondensation process.

In the esterfication-polycondensation process at least one aromatic dicarboxylic acid or mixture of two or more dicarboxylic acids or mixture of at least one aromatic dicarboxylic acid and at least one saturated aliphatic dicarboxylic acid with at least one glycol are added to an esterification vessel and reacted at temperatures ranging from 180° to 270° C. After completion of the esterification reaction a condensation catalyst is added and the mixture subjected to polycondensation conditions. These conditions include temperatures ranging from about 250° to about 300° C. and preferably from about 260° C. to about 280° C. and pressures below 10 millimeters of mercury pressure and preferably below 1.0 millimeter of mercury pressure, although other pressures and temperatures can also be employed. Catalysts useful in the polycondensation reaction include antimony compounds such as antimony trioxide, titanium compounds such as titanium alcoholate and polymeric ethylene glycol titanate, litharge, lead acetate and other well known condensation catalysts. Generally the polycondensation reaction is continued until higher molecular weight polyester resin, i.e. resin having an intrinsic viscosity of at least 0.4 as measured in a 60/40 phenol/tetrachloroethane mixed solvent at 30° C., is attained.

When the copolyesters of this invention are prepared employing the esterification-polycondensation process the aromatic dicarboxylic acids which can be used include terephthalic acid, isophthalic acid, the 2,6- and 2,7-naphthalene dicarboxylic acids, phenylindane dicarboxylic acid and the like and mixtures thereof. The saturated aliphatic dicarboxylic acids which can be employed in mixture with the above described aromatic dicarboxylic acids are those saturated aliphatic dicarboxylic acids containing from 4 to 10 carbon atoms, such as succinic acid and substituted succinic acid of the formula

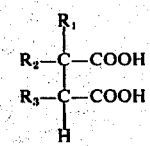

in which $R_1$ is a radical selected from the group consisting of alkenyl and alkyl radicals, $R_2$ and $R_3$ are selected from the same and different radicals selected from the group consisting of hydrogen, alkenyl and alkyl radicals and the sum of the number of carbon atoms contained in $R_1$, $R_2$ and $R_3$ is at least 12. Representative examples of alkenyl and alkyl radicals containing less than 12 carbon atoms are ethylene, propylene, the butylene, the amylene, the hexylene, the heptylene, the octylene, nonylene, decylene and undecylene radicals and alkyl radicals such as methyl, ethyl, propyl, the butyl, the amyl, the hexyl, the heptyl, the octyl, nonyl, decyl and undecyl radicals. Representative examples of long chain alkenyl radicals are dodecenyl, tridecenyl, tetradecenyl, pentadecenyl, hexadecenyl, octadecenyl, nonadecenyl, eicosenyl, heneicosenyl, docosenyl, triacontenyl and pentatriacontanyl radicals. Representative examples of long chain alkyl radicals are dodecyl, tridecyl, tetradecyl, pentadecyl, hexadecyl, eicosyl, heneicosyl, docosyl, triacontyl and pentatriacontanyl radicals. In addition to the above succinic and substituted succinic acids further useful $C_4$ to $C_{10}$ saturated aliphatic dicarboxylic acids include adipic acid, suberic acid, sebacic acid and the like. Mixtures of these saturated aliphatic acids can also be employed. The preferred copolyesters, however, are those prepared from the single aromatic dicarboxylic acid, terephthalic acid, ethylene glycol and a hindered phenolic comonomer as defined herein.

In the transesterification-polycondensation reaction by which the copolyester of this invention can also be prepared at least one aromatic dicarboxylic acid ester, i.e. a $C_1$ to $C_4$ lower alkyl ester of an aromatic dicarboxylic acid or mixture of two or more of said aromatic dicarboxylic acid esters or mixture of at least one aromatic dicarboxylic acid ester and at least one $C_1$ to $C_4$ lower alkyl ester of saturated aliphatic dicarboxylic acid with at least one glycol are added to a transesterification vessel together with a transesterification catalyst such as, for example, zinc acetate, manganese acetate, calcium acetate, alkali metal alcoholates and the like. The reaction is carried out at elevated temperatures which can range from about 160° to about 210° C. and preferably from about 185° to about 205° C. under nitrogen pressure. The reaction is continued until all or nearly all of the alcohol by-product has been removed. The transesterification product is then transferred to a polycondensation vessel where the polycondensation reaction is carried out as described above.

Various other materials may be present in the reaction mixtures, for example, color inhibitors such as alkyl or aryl phosphate esters may be used. In addition, pigments, delusterants or other additives may also be present.

The invention has been illustrated below employing the transesterification and polycondensation of a mixture of dimethyl terephthalate, ethylene glycol and various copolymerizable hindered phenolic comonomers corresponding to the above generic formula. However, the invention also includes copolyesters prepared from various other $C_1$ to $C_4$ lower alkyl esters of aromatic dicarboxylic acids or mixtures thereof or mixtures of aromatic dicarboxylic acid esters and saturated aliphatic dicarboxylic esters and glycols. For example, in addition to the dimethyl ester of terephthalic acid, the ethyl, propyl and butyl esters of terephthalic acid can also be employed, as well as the methyl, ethyl, propyl and butyl esters of such other aromatic dicarboxylic acids such as isophthalic acid, the 2,6- and 2,7-naphthalene dicarboxylic acids and phenylindane dicarboxylic acid. Mixtures of these various aromatic dicarboxylic acid esters can also be employed. The esters of saturated aliphatic dicarboxylic acids which can be employed in mixture with the above described aromatic dicarboxylic acid esters include the $C_1$ to $C_4$ lower alkyl esters of saturated aliphatic dicarboxylic acids containing from 4 to 10 carbon atoms such as succinic acid, the substituted succinic acids described hereinabove, adipic acid, azelaic acid, suberic acid, sebacic acid and the like. Again, mixtures of two or more of these various saturated aliphatic dicarboxylic acid esters can also be employed. However, the singular use of the acid ester, dimethyl terephthalate with ethylene glycol and a hindered phenolic comonomer as defined herein is preferred.

In addition to ethylene glycol, various other glycols which correspond to the formula $HO(CH_2)_nOH$ wherein $n$ is an integer ranging from 2 to 10 can also be used. Representative examples of such various other glycols include propylene glycol, tetramethylene glycol, neopentyl glycol, hexamethylene glycol, decamethylene glycol and the cycloaliphatic glycol, 1,4-cyclohexanedimethanol. Mixtures of two or more of these glycols can also be employed. Ethylene glycol is the preferred glycol.

The copolymerizable hindered phenolic comonomers corresponding to the above formula and which possess functional groups capable of undergoing condensation with either the dicarboxylic acid, the $C_1$ to $C_4$ lower alkyl ester thereof or the glycol can be employed in amounts ranging from about 0.1 to about 10.0 mol percent based on the starting dicarboxylic acid or acid ester. A more preferred range is from 0.25 to 5.0 mol percent.

The point of addition of the hindered phenolic comonomers to the polyester forming processes employed will be dependent on the particular process employed and on the nature of the terminal functional groups on the hindered phenolic comonomer used. For example, when the process employed to prepare the thermooxidative stable copolyesters of this invention is the esterification-polycondensation process the hindered phenolic comonomer will generally be added at the beginning of the esterification stage of the process regardless of whether the hindered phenolic comonomer possesses terminal hydroxyl, carboxyl or ester groups. However, when the process employed to prepare the thermo-oxidative stable copolyesters of this invention is the transesterification-polycondensation process only those hindered phenolic comonomers containing terminal hydroxyl and ester groups can be added at the beginning of the transesterification stage of the process. Copolymerizable hindered phenolic comonomers containing terminal carboxyl groups must be added after completion of the transesterification reaction, since the carboxyl groups of the phenolic comonomers tend to react with or deactivate in some manner the catalyst employed in promoting the transesterification reaction.

In general the hindered phenolic comonomers corresponding to the above formula and useful in preparing copolyesters of this invention can be prepared according to any one of the following procedures:

The dialkyl 2-(3,5-ditertiaryalkyl-4-hydroxybenzyl) malonates and the dialkyl 2,2-bis(3,5-ditertiaryalkyl-4-hydroxybenzyl) malonates may be prepared by reacting 3,5-ditertiaryalkyl-4-hydroxybenzyl chlorides or bromides with a lower alkyl ester of malonic acid in the presence of an acid acceptor such as sodium ethoxide or triethylamine. The reaction is carried out at, or slightly above, room temperature in a solvent such as ethanol or tetrahydrofuran. The dialkyl 2-(3,5-ditertiarybutyl-4-hydroxyphenyl) succinates and the dialkyl 2,2-bis(3,5-ditertiaryalkyl-4-hydroxyphenyl) succinates may be prepared by reacting 2,6-ditertiaryalkyl phenols with a lower alkyl ester of maleic acid. The reaction is carried out by heating a mixture of the two compounds in the presence of a base such as potassium tertiary butoxide or sodium methoxide in a solvent such as tertiarybutyl alcohol or dimethyl sulfoxide. The esters obtained from both of the above procedures may be reduced to the corresponding diols by reaction with lithium aluminum hydride in a solvent such as tetrahydrofuran or ethyl ether. The reaction may be carried out at, or slightly above, room temperature.

The esters obtained from both of the above procedures may also be hydrolyzed to the corresponding acids by base catalysis followed by acidification to liberate the free acid from its salt. Bases which may be used to catalyze this reaction include alkali metal hydroxides such as sodium and potassium hydroxides. Water alone is suitable as a solvent for the reaction although it is preferred to use a water miscible organic solvent capable of dissolving the ester. Suitable water miscible cosolvents include the lower aliphatic alcohols such as methanol, ethanol and isopropanol. The acids may be liberated from their salts by the addition of an aqueous solution of a mineral acid such as hydrochloric or sulfuric acid.

Representative examples of copolymerizable hindered phenolic comonomers corresponding to the above formula which possess terminal hydroxyl, carboxyl or ester groups capable of undergoing condensation with either the dicarboxylic acid, the $C_1$ to $C_4$ lower alkyl ester thereof or the glycol include hindered phenolic esters such as:

dimethyl 2-(3,5-ditertiarybutyl-4-hydroxybenzyl) malonate
dimethyl 2-(3,5-ditertiarybutyl-4-hydroxyphenyl) succinate
dimethyl 2-(3,5-ditertiaryhexyl-4-hydroxybenzyl) malonate
diethyl 2-(3,5-ditertiarybutyl-4-hydroxybenzyl) malonate
diethyl 2-(3,5-ditertiarybutyl-4-hydroxyphenyl) succinate
diethyl 2-(3,5-ditertiaryoctyl-4-hydroxybenzyl) malonate
and the like;
hindered phenolic diols such as:
2-(3,5-ditertiarybutyl-4-hydroxybenzyl)-1,3-propanediol
2-(3,5-ditertiarypentyl-4-hydroxybenzyl)-1,3-propanediol
2-(3,5-ditertiaryhexyl-4-hydroxybenzyl)-1,3-propanediol
2-(3,5-ditertiarybutyl-4-hydroxyphenyl)-1,4-butanediol
2-(3,5-ditertiaryhexyl-4-hydroxyphenyl)-1,4-butanediol
2-(3,5-ditertiaryoctyl-4-hydroxyphenyl)-1,4-butanediol
and the like;
and hindered phenolic acids such as:
2-(3,5-ditertiarybutyl-4-hydroxybenzyl) malonic acid
2-(3,5-ditertiarybutyl-4-hydroxyphenyl) succinic acid
2-(3,5-ditertiarypentyl-4-hydroxyphenyl) succinic acid
2-(3,5-ditertiaryheptyl-4-hydroxybenzyl) malonic acid
and the like;
and the bis esters, diols and acids where $m$ in the formula above is the integer 2, such as:
diethyl 2,2-bis(3,5-ditertiarybutyl-4-hydroxybenzyl)-malonate
diethyl 2,2-bis(3,5-ditertiarybutyl-4-hydroxyphenyl)-succinate
dimethyl 2,2-bis(3,5-ditertiaryheptyl-4-hydroxyphenyl)succinate
2,2-bis(3,5-ditertiarybutyl-4-hydroxybenzyl)-1,3-propanediol
2,2-bis(3,5-ditertiarybutyl-4-hydroxyphenyl)-1,4-butanediol
2,2-bis(3,5-ditertiaryhexyl-4-hydroxybenzyl)-1,3-propanediol
2,2-bis(3,5-ditertiarybutyl-4-hydroxybenzyl) malonic acid
2,2-bis(3,5-ditertiarybutyl-4-hydroxyphenyl) succinic acid
2,2-bis(3,5-ditertiaryhexyl-4-hydroxyphenyl) succinic acid
and the like.

It is understood that the above list of hindered phenolic esters, diols and acids form but a partial listing of comonomers which correspond to the above generic formula and which are useful in preparing the thermooxidative stable copolyesters of this invention. Of the above listed hindered phenolic esters, diols and acids and others corresponding to the above generic formula those in which R is the tertiarybutyl radical are the most preferred comonomers.

The following examples serve to illustrate the invention. All parts and percentages, where employed, are by weight unless stated otherwise. The intrinsic viscosities (I.V.) of the copolyester samples were determined in 0.1 gram samples dissolved in a 60/40 (wt./wt. ratio) phenol/tetrachloroethane mixed solvent at 30° C. The "Carboxyl No." represents the amount of free carboxyl end groups in the copolyester as determined by the method described by Pohl in *Analytical Chemistry*, Vol. 26, page 1614 (1954) and is expressed in equivalents per million grams of copolyester (eq./$10^6$ grams). The stability of the copolyesters was determined by comparing the number of ester groups per million grams of copolyester before and after subjecting the copolyester to a thermooxidative degradative environment. Any increase in the number of ester groups after being subjected to such an environment is a result of bond breakage along the polymer chains. Thus the stability of the copolyester of the present invention is expressed in terms of the number of broken bonds present after treatment per million grams of copolyester (BB/$10^6$ grams).

EXAMPLE 1

A mixture of 45 grams of dimethyl terephthalate (DMT), 40 milliliters of ethylene glycol (EG), 4.2 grams (6 mol percent) of 2-(3,5-ditertiarybutyl-4-hydroxybenzyl-1,3-propanediol (DBHP), 0.015 gram of manganese acetate and 0.015 gram of antimony trioxide was placed in a glass reaction tube equipped with a stirrer and a side arm with a condenser. This mixture was heated at 150° to 200° C. with continuous agitation for four hours during which time 16 milliliters of methanol were distilled out. The temperature was then raised to 235° C. for 15 minutes after which it was then raised to 250° C. After 10 minutes at this temperature and atmospheric pressure the pressure was gradually reduced over a 20 minute period to 0.7 Torr and the temperature gradually increased to 260° C. After 90 minutes at 260° C. and 0.7 Torr the copolyester exhibited a high melt viscosity and the polycondensation reaction was terminated. The intrinsic viscosity of this copolyester was 0.574 and the melting point was 241.5° C. as determined by differential thermal analysis (DTA). It was observed that, contrary to the behavior of a melted polyethylene terephthalate control sample, this copolyester melt did not darken on the surface when exposed to air for 10 minutes.

EXAMPLE 2

A copolyester was prepared from DMT, EG and DBHP in the same manner as in Example 1 except that only 3.0 mol percent of DBHP was employed in its preparation. The copolyester had an I.V. of 0.629 and a carboxyl number of 11 eq./$10^6$ grams. At the end of the polymerization cycle the molten copolyester was maintained at a temperature of 275° C. and after removal of a small sample for I.V. and carboxyl number determination, air was introduced into the molten copolyester through the hollow stirrer shaft at a rate of 315 cubic centimeters per minute (cc./min.) to test the thermal oxidative stability of the copolyester. Samples of the copolyester were removed periodically during this heat and air treatment in order to monitor any changes in I.V. and carboxyl number. Table I below contains all the data pertaining to the thermo-oxidative stability of the copolyester.

To demonstrate the improved thermo-oxidative stability of the copolyester prepared in Example 2 over a well known polyester, a control experiment was performed wherein a sample of poly(ethylene terephthalate) derived from DMT and EG was prepared and tested in the same manner and under the same conditions as the copolyester. Table II contains all the data relating to the thermo-oxidative stability of the poly(ethylene terephthalate) control.

TABLE I

| Time of Air Treatment, Min. | I.V. | BB/$10^6$ G. | Carboxyl No. |
|---|---|---|---|
| 0 | 0.629 | — | 11 |
| 13 | 0.603 | 3 | 13 |
| 17 | 0.601 | 3.5 | 15 |
| 23 | 0.591 | 5.0 | 18 |
| 33 | 0.570 | 7.5 | 20 |
| 41 | 0.571 | 7.5 | — |

TABLE I-continued

| Time of Air Treatment, Min. | I.V. | BB/$10^6$ G. | Carboxyl No. |
|---|---|---|---|

TABLE II

| Time of Air Treatment, Min. | I.V. | BB/$10^6$ G. | Carboxyl No. |
|---|---|---|---|
| 0 | 0.526 | — | 11 |
| 10 | 0.462 | 14 | 50 |
| 16 | 0.407 | 32 | 83 |
| 23 | 0.355 | 51 | 117 |
| 28 | 0.340 | 60 | 186 |

From a comparison of the data in Tables I and II it is readily apparent that the copolyester prepared from DMT, EG and 3.0 mol percent of DBHP is far superior in its resistance to thermo-oxidative degradation than the poly(ethylene terephthalate) control sample.

EXAMPLES 3 – 8

A series of five copolyesters was prepared in a manner similar to that described in Example 1. The copolyesters were prepared from dimethyl terephthalate, ethylene glycol and various copolymerizable hindered phenolic comonomers. Melts of each of the copolyesters were tested for thermo-oxidative stability by exposing the surface of the melts to a stream of air for 10 minutes. If the surface did not darken during this exposure period the sample was considered to have excellent thermooxidative stability. Table III below contains all pertinent information. Also included in this table for comparison purposes is a poly(ethylene terephthalate) control sample which was subjected to the same identical conditions as the copolyesters of the invention.

TABLE III

| Example No. | Comonomer | Mol % | I.V. | Thermo-oxidative Behavior |
|---|---|---|---|---|
| 3 | 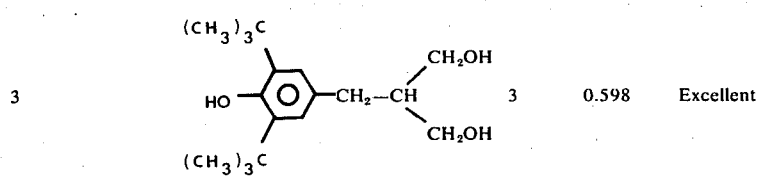 | 3 | 0.598 | Excellent |
| 4 | 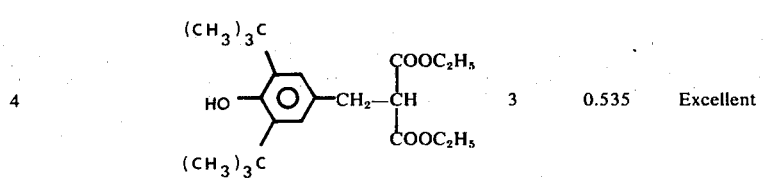 | 3 | 0.535 | Excellent |
| 5 | 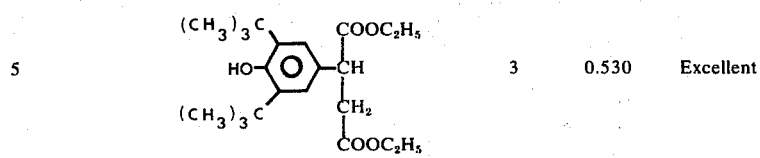 | 3 | 0.530 | Excellent |

TABLE III-continued

| Example No. | Comonomer | Mol % | I.V. | Thermo-oxidative Behavior |
| --- | --- | --- | --- | --- |
| 6 | (CH₃)₃C, HO—⟨O⟩—CH(COOC₂H₅)—CH₂—COOC₂H₅, (CH₃)₃C [3,5-di-tert-butyl-4-hydroxyphenyl diethyl substituted structure] | 1.25 | 0.608 | Excellent |
| 7 | (CH₃)₃C, HO—⟨O⟩—CH₂—C(CH₂OH)(CH₂OH)—CH₂—⟨O⟩—OH, (CH₃)₃C, C(CH₃)₃, C(CH₃)₃ | 5 | 0.500 | Excellent |
| 8 | Poly(ethylene terephthalate) | — | 0.600 | Poor - melt darkens soon after exposure to air. |

EXAMPLE 9

To further demonstrate the thermo-oxidative stability of the copolyesters of this invention the copolyester from Example 6 above was spun at a temperature of 320° C. and a draw ratio of 5.8:1X into 348 denier fiber. The fiber exhibited a tensile of 1.67 pounds, a tenacity of 2.18 grams/denier, an elongation of 11.9 percent and a carboxyl number of 22 eq./$10^6$ grams. Fibers of this copolyester and a poly(ethylene terephthalate) control were formed into small bundles (0.2 gram each) and dried under vacuum at 135° C. for 6 hours. At the end of this time the bundles were transferred to an air oven set at a temperature of 175° C. Samples of the copolyester and the control fibers were withdrawn after 24, 48 and 72 hours. Data obtained in the accelerated aging test are set forth in Table IV below.

TABLE IV

| Fiber Sample | Hours at 175° C. | | | |
| --- | --- | --- | --- | --- |
| | 0 | 24 | 48 | 72 |
| Example No. 6 | | | | |
| I.V. | 0.575 | 0.561 | 0.551 | 0.534 |
| BB/$10^6$ g. | 0 | 2 | 4 | 5.5 |
| Control | | | | |
| I.V. | 0.606 | 0.553 | 0.545 | 0.534 |
| BB/$10^6$ g. | 0 | 7 | 9.5 | 11.0 |

From the above table it can be seen that the copolyester containing 1.25 mol percent of units of a copolymerizable hindered phenolic comonomer provides improved thermo-oxidative stability over that of the control fibers, the number of broken bonds in the control fibers being at least twice that of the copolyester fibers illustrative of the present invention. The above data also disclose that the percentage decrease in I.V. of the control fibers is also nearly twice that of the fibers drawn from a copolyester of this invention.

EXAMPLE 10

A mixture of 34 grams of dimethyl terephthalate, 34 grams of ethylene glycol, 0.0144 gram of manganese acetate and 0.0144 gram of antimony trioxide was placed in a glass reaction tube equipped with a stirrer and a side arm with a condenser. The mixture was heated at 185° to 200° C. until the evolution of methanol had ceased. At this time there was then added 14.1 grams of azelaic acid and 2.47 grams (2.0 mol percent) of 2,2-bis(3,5-ditertiarybutyl-4-hydroxybenzyl)-1,3-propanediol and the reaction temperature increased to 235° C. After 25 minutes at 235° C. the reaction temperature was raised to 250° C. After about 15 minutes at 250° C. reduction of the pressure in the reaction vessel was commenced. Over a period of about 30 minutes the pressure was reduced from atmospheric pressure to 0.2 Torr. The temperature was then raised to 265° C. and this temperature and the reduced pressure maintained for 65 minutes to yield a highly viscous polymer melt which upon being exposed to air did not darken, indicating resistance to thermo-oxidative degradation. The intrinsic viscosity of this material was determined to be 0.654.

While certain representative embodiments and details have been shown for the purpose of illustrating the invention it will be apparent to those skilled in this art that various changes and modifications may be made therein without departing from the spirit or scope of the invention.

What is claimed is:
1. High molecular weight linear copolyester compositions having improved thermo-oxidative stability comprising the condensation product of

A. an ester forming reactant selected from the group consisting of aromatic dicarboxylic acids or the $C_1$ to $C_4$ lower alkyl esters thereof, mixtures of two or more of said aromatic dicarboxylic acids or two or more of the $C_1$ to $C_4$ lower alkyl esters thereof, mixtures of at least one of said aromatic dicarboxylic acids with at least one saturated aliphatic dicarboxylic acid containing from 4 to 10 carbon atoms and mixtures of at least one of the $C_1$ to $C_4$ lower alkyl esters of said aromatic dicarboxylic acids with at least one $C_1$ to $C_4$ lower alkyl ester of said saturated aliphatic dicarboxylic acids containing from 4 to 10 carbon atoms, B. glycols selected from the group consisting of glycols of the series $HO(CH_2)_nOH$ where $n$ is an integer from 2 to 10 and 1,4-cyclohexanedimethanol and C. copolymerizable hindered phenolic comonomers selected from the group consisting of hindered phenolic comonomers corresponding to the formula

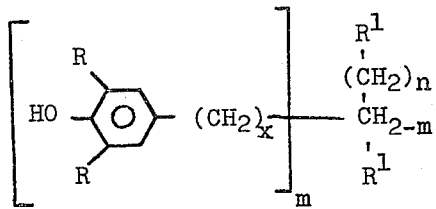

where $x$ and $n$ are integers ranging from 0 to 1, $m$ is an integer ranging from 1 to 2, R is a tertiary alkyl radical containing from 4 to 8 carbon atoms and $R^1$ is a radical selected from the group consisting of —$CH_2OH$, —COOH and —$COOR^2$ where $R^2$ is an alkyl radical containing from 1 to 4 carbon atoms and mixtures thereof, and wherein units of said copolymerizable hindered phenolic comonomers are present in the copolyester in an amount ranging from about 0.1 to 10.0 mol percent of (A).

2. The copolyester compositions of claim 1 wherein (A) is selected from the group consisting of aromatic dicarboxylic acids, mixtures thereof and the aromatic dicarboxylic acid $C_1$ to $C_4$ lower alkyl esters and mixtures thereof, (B) is selected from the group consisting of glycols of the series $HO(CH_2)_nOH$ where $n$ is an integer from 2 to 10, 1,4-cyclohexanedimethanol and mixtures thereof and (C) is selected from the group of hindered phenolic comonomers and mixtures thereof and wherein the tertiary alkyl radical R of said comonomers is tertiarybutyl radical.

3. The copolyester compositions of claim 2 wherein (A) is selected from the group consisting of terephthalic acid and dimethyl terephthalate, (B) is selected from the group consisting of glycols of the series $HO(CH_2)_nOH$ where $n$ is an integer from 2 to 10, 1,4-cyclohexanedimethanol and mixtures thereof and (C) is selected from the group consisting of hindered phenolic comonomers and mixtures thereof and wherein the tertiary alkyl radical, R of said comonomers is tertiarybutyl radical.

4. The copolyester compositions of claim 3 wherein (A) is dimethyl terephthalate, (B) is ethylene glycol and (C) is selected from the group consisting of hindered phenolic comonomers and mixtures thereof and wherein the tertiary alkyl radical, R, is tertiarybutyl radical and $R^1$ is selected from the group consisting of —$CH_2OH$ and —$COOR^2$ where $R^2$ is selected from the group consisting of methyl and ethyl radicals.

5. The copolyester compositions of claim 4 wherein (C) is selected from the group consisting of 2-(3,5-ditertiarybutyl-4-hydroxybenzyl)-1,3-propanediol; 2,2-bis(3,5-ditertiarybutyl-4-hydroxybenzyl)-1,3-propanediol; diethyl 2-(3,5-ditertiarybutyl-4-hydroxybenzyl) malonate and diethyl 2(3,5-ditertiarybutyl-4-hydroxyphenyl succinate.

6. The copolyester compositions of claim 3 wherein (A) is terephthalic acid, (B) is ethylene glycol and (C) is selected from the group consisting of hindered phenolic comonomer wherein the tertiary alkyl radical is tertiarybutyl radical and $R^1$ is —COOH radical.

7. The copolyester compositions of claim 6 wherein (C) is selected from the group consisting of 2-(3,5-ditertiarybutyl-4-hydroxybenzyl) malonic acid; 2,2-bis(3,5-ditertiarybutyl-4-hydroxybenzyl) malonic acid; 2-(3,5-ditertiarybutyl-4-hydroxyphenyl) succinic acid and 2,2-bis(3,5-ditertiarybutyl-4-hydroxyphenyl) succinic acid.

8. The copolyester compositions of claim 2 wherein (A) is selected from the group consisting of 2,6-naphthalene dicarboxylic acid; 2,7-napthalene dicarboxylic acid and mixtures thereof; 2,6-dimethyl naphthalate and 2,7-naphthalate and mixtures thereof, (B) is selected from the group consisting of glycols of the series $HO(CH_2)_nOH$ where $n$ is an integer from 2 to 10, 1,4-cyclohexanedimethanol and mixtures thereof, and (C) is selected from the group consisting of hindered phenolic comonomers and mixtures thereof wherein the tertiary alkyl radical, R, of said comonomers is tertiarybutyl radical.

9. The copolyester compositions of claim 8 wherein (A) is selected from the group consisting of 2,6-dimethyl naphthalate; 2,7-dimethyl naphthalate and mixtures thereof, (B) is ethylene glycol and (C) is selected from the group consisting of hindered phenolic comonomers and mixtures thereof and wherein the tertiary alkyl radical, R, is tertiarybutyl radical and $R^1$ is selected from the group consisting of —$CH_2OH$ and —$COOR^2$ where $R^2$ is selected from the group consisting of methyl and ethyl radicals.

10. The copolyester composition of claim 9 wherein (C) is selected from the group consisting of 2-(3,5-ditertiarybutyl-4-hydroxybenzyl)-1,3-propanediol; 2,2-bis(3,5-ditertiarybutyl-4-hydroxybenzyl)-1,3-propanediol; diethyl 2-(3,5-ditertiarybutyl-4-hydroxybenzyl) malonate and diethyl 2-(3,5-ditertiarybutyl-4-hydroxyphenyl) succinate.

11. The copolyester compositions of claim 8 wherein (A) is selected from the group consisting of 2,6-naphthalene dicarboxylic acid; 2,7-naphthalene dicarboxylic acid and mixtures thereof, (B) is ethylene glycol and (C) is selected from the group consisting of hindered phenolic comonomers and mixtures thereof and wherein the tertiary alkyl radical, R, is tertiarybutyl radical and $R^1$ is —COOH radical.

12. The copolyester compositions of claim 11 wherein (C) is selected from the group consisting of 2-(3,5-ditertiarybutyl-4-hydroxybenzyl) malonic acid; 2,2-bis(3,5-ditertiarybutyl-4-hydroxybenzyl) malonic acid; 2-(3,5-ditertiarybutyl-4-hydroxyphenyl) succinic acid and 2,2-bis(3,5-ditertiarybutyl-4-hydroxyphenyl) succinic acid.

* * * * *